United States Patent
Smith

(10) Patent No.: US 9,321,175 B2
(45) Date of Patent: Apr. 26, 2016

(54) ROBOTIC MANIPULATOR ARTICULATION TECHNIQUES

(71) Applicant: MDA U.S. Systems, LLC, Pasadena, CA (US)

(72) Inventor: Kenneth S. Smith, Altadena, CA (US)

(73) Assignee: MDA U.S. Systems, LLC, Pasadena, CA (US)

( * ) Notice: Subject to any disclaimer, the term of this patent is extended or adjusted under 35 U.S.C. 154(b) by 310 days.

(21) Appl. No.: 13/781,195

(22) Filed: Feb. 28, 2013

(65) Prior Publication Data

US 2014/0244039 A1 Aug. 28, 2014

(51) Int. Cl.
  *B25J 9/16* (2006.01)

(52) U.S. Cl.
  CPC .............. *B25J 9/1607* (2013.01); *B25J 9/1643* (2013.01); *Y10S 901/02* (2013.01)

(58) Field of Classification Search
  CPC .......... B25J 9/1643; B25J 9/1607; B25J 9/16; B25J 9/1602; B25J 9/1628; B25J 9/163; B25J 9/1656; B25J 9/1664; Y10S 901/02; G05B 19/408; G05B 19/4083; G05B 19/4086; G05B 2219/39062; G05B 2219/39224; G05B 2219/39184; G05B 2219/39296; G05B 2219/40495
  USPC ................... 318/567, 568.1, 568.11, 568.24, 318/568.25; 701/245, 250, 262, 263; 700/245, 250, 262, 263
  See application file for complete search history.

(56) References Cited

U.S. PATENT DOCUMENTS

| 4,763,276 | A | * | 8/1988 | Perreirra | B25J 9/1653 700/254 |
| 4,975,856 | A | * | 12/1990 | Vold | B25J 9/1602 318/568.19 |
| 5,159,249 | A | * | 10/1992 | Megherbi | B25J 9/1664 318/568.1 |
| 5,276,390 | A | * | 1/1994 | Fisher | B25J 9/1633 318/561 |
| 5,430,643 | A | * | 7/1995 | Seraji | B25J 9/1643 318/568.11 |
| 2005/0143860 | A1 | * | 6/2005 | Nakajima | B25J 9/1643 700/245 |
| 2012/0303318 | A1 | | 11/2012 | Milenkovic | |

FOREIGN PATENT DOCUMENTS

DE 19547121 A1 * 5/1996 ............. B25J 9/1607

OTHER PUBLICATIONS

Kreutz-Delgado et al.; Kinematic analysis of 7-DOF manipulators; The International Journal of Robotics Research; vol. 11, No. 5; Oct. 1992; pp. 469-481.*

(Continued)

*Primary Examiner* — Stephen Holwerda
(74) *Attorney, Agent, or Firm* — Weaver Austin Villeneuve & Sampson LLP

(57) ABSTRACT

A controller determines a set of solutions to an inverse kinematic relationship relating received three axes position and orientation requirements defining a tool control point (TCP) of a robotic manipulator, the robotic manipulator including at least seven revolute joints, to a respective angular position of each of the seven revolute joints. The set of solutions specifies, in terms of an angular position of a first revolute joint proximate to a proximal end of the robotic manipulator, at least one set of angular positions of the second, third, fourth, fifth, sixth and seventh revolute joints. The set of solutions results from solving only closed-form mathematical expressions.

18 Claims, 6 Drawing Sheets

(56) References Cited

OTHER PUBLICATIONS

Asfour et al.; Human-like motion of a humanoid robot arm based on a closed-form solution of the inverse kinematics problem; Proceedings of the 2003 IEEE/RSJ Intl. Conference on Intelligent Robots and Systems; Oct. 2003; pp. 1407-1412.*

Tondu; A closed-form inverse kinematic modelling of a 7R anthropomorphic upper limb based on a joint parameterization; 2006 6th IEEE-RAS International Conference on Humanoid Robots; Dec. 2006; pp. 390-397.*

Shimizu et al.; Analytical inverse kinematic computation for 7-DOF redundant manipulators with joint limits and its application to redundancy resolution; IEEE Transactions on Robotics; vol. 24, No. 5; Oct. 2008; pp. 1131-1142.*

Diankov, Rosen, "Automated Construction of Robotic Manipulation Programs", The Robotics Institute, Carnegie Mellon University, Aug. 26, 2010, 263 pages.

* cited by examiner

ROBOTIC MANIPULATOR ARTICULATION TECHNIQUES

TECHNICAL FIELD

This invention relates generally to articulated mechanisms, including robotic manipulators, and in particular, to techniques enabling efficient planning and execution of articulations of such manipulators.

BACKGROUND

The assignee of the present invention develops robotic systems for, inter alia, planetary exploration and satellite servicing. For example, a robotic manipulator suitable for satellite servicing has been developed for the Defense Advanced Research Projects Agency (DARPA) Front-end Robotics Enabling Near-term Demonstration (FREND) program. The FREND robotic manipulator, illustrated in FIG. 1, is a seven degree of freedom (DOF) robotic arm. A sequence of seven revolute joints are organized as a 3 DOF "shoulder" joint 110 proximate to base 105 of robotic arm 100, and a 3 DOF "wrist" joint 130 proximate to an end effector (not shown). Linking the shoulder joint and wrist joint, and disposed therebetween, is a 1 DOF "elbow" joint 120.

In addition to satellite servicing, manipulators such as the FREND robotic manipulator may be used for industrial applications, and remote teleoperations during planetary or under seas exploration missions, and national defense operations, for example. Desirably, the controller for such manipulators should be configured to support efficient planning of arm movements, as well as autonomous or semi-autonomous operations of the arm. For example, the controller should be configured to determine, for a given desired end effector three axis position and orientation (which may be referred to hereinafter as the "tool control point", or TCP), a description of one or more sets of joint angles that will achieve the TCP. Making the above mentioned determination may be referred to as finding the solutions satisfying the inverse kinematic expressions that relate TCP to joint angles.

Although solution of the forward kinematic equations, i.e., finding the TCP resulting from a given a set of joint angles, is straightforward, closed-form solutions to the reverse kinematic expressions have proven elusive for 7 DOF manipulators such as the FREND robotic manipulator. As a result, operating, and planning the operation of such manipulators has required computationally-intensive techniques such as Newton-Raphson converging approximations, for example. Such techniques are undesirable, particularly for remote teleoperations in space, or for other hostile environments and applications where computational resources may be limited and/or processing speed may be critical. Moreover, such techniques generally produce only a single solution, whereas, for a 7 DOF manipulator, there will usually be a sheaf of possible joint angle solutions to achieve a particular TCP.

As a result, an improved approach to a robotic manipulator controller that makes use of a closed-form inverse kinematic solution is desirable.

SUMMARY

In an embodiment, three axes position and orientation requirements defining a tool control point (TCP) of a robotic manipulator are received, the robotic manipulator including at least seven revolute joints. The TCP is proximate to a distal end of the robotic manipulator, the distal end being proximate to a wrist joint, the wrist joint being articulable in a first set of three axes intersecting at a common wrist joint origin by way of a fifth revolute joint, a sixth revolute joint and a seventh revolute joint, each of the fifth, sixth and seventh revolute joints having a respective axis of rotation, the fifth axis of rotation being orthogonal to the sixth axis of rotation, and the seventh axis of rotation being orthogonal to the sixth axis of rotation. A shoulder joint is proximal to a proximal end of the robotic manipulator, the shoulder joint being rotatable about a first axis of rotation by way of a first revolute joint, about a second axis of rotation by way of a second revolute joint and about a third axis of rotation by a third revolute joint, the first axis of rotation being orthogonal to the second axis of rotation, the third axis of rotation being orthogonal to the second axis of rotation. The robotic manipulator further includes an elbow joint disposed between the shoulder joint and the wrist joint, the elbow joint being rotatable about a fourth axis of rotation by way of a fourth revolute joint, the fourth axis of rotation being orthogonal to the third axis of rotation and to the respective axis of rotation of the fifth revolute joint. A controller determines a set of solutions to an inverse kinematic relationship, the inverse kinematic relationship relating the received three axes position and orientation requirements defining the TCP to a respective angular position of each of the seven revolute joints. The set of solutions specifies, in terms of an angular position of the first revolute joint and parameterized link lengths, at least one set of angular positions of the second, third, fourth, fifth, sixth and seventh revolute joints. The set of solutions result from solving only closed-form mathematical expressions.

In an embodiment, the controller may articulate the robotic manipulator in conformance with at least one of the set of solutions.

In an embodiment, the controller outputs a graphical representation of the set of solutions. The graphical representation may include a 2D or 3D simulation of dynamic articulations of the robotic manipulator.

In another embodiment, the first revolute joint may be nearer to the proximal end of the robotic manipulator than both of the second revolute joint and the third revolute joint. The robotic manipulator may include exactly seven revolute joints.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
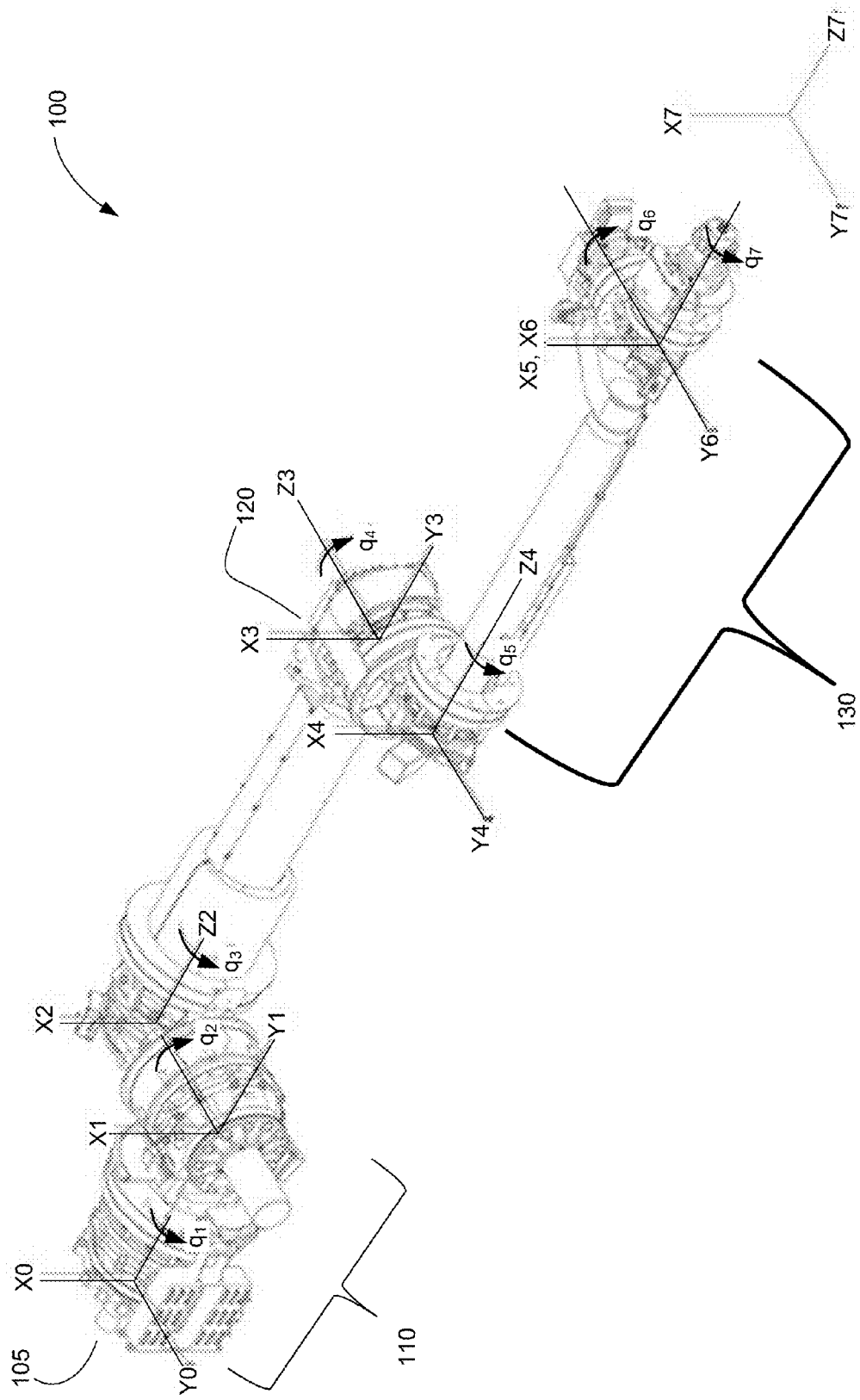
FIG. 1 shows an example of a 7 DOF robotic manipulator arm.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The present inventor has developed techniques that enable more efficient planning and execution of repositioning motions of articulable mechanisms, more particularly of seven degree of freedom (DOF) robotic manipulators. A better understanding of the present disclosure may be obtained by referring first to FIG. 2, which illustrates a simplified schematic of robotic manipulator system 200, including robotic manipulator 100 and controller 201 communicatively coupled with robotic manipulator 100 by way of communication paths 202.

In the illustrated implementation, base 105 of robotic manipulator 100 is proximate to shoulder joint 110 (FIG. 1), which includes first revolute joint 111, second revolute joint 112, and third revolute joint 113. Base 105 may be attached to a parent structure or vehicle (not illustrated), or, directly or indirectly, to the ground. Each revolute joint 111, 112, and 113 may be rotatably coupled to a respective actuator so as to be rotatable about a respective axis of rotation. For example, first revolute joint 111 is rotatable about first axis of rotation 111a; second revolute joint 112 is rotatable about second axis of rotation 112a; and third revolute joint 113 is rotatable about third axis of rotation 113a. First axis of rotation 111a may be orthogonal to second axis of rotation 112a, whereas third axis of rotation 113a may be orthogonal to second axis of rotation 112a. For clarity of illustration, each of first revolute joint 111, second revolute joint 112, and third revolute joint 113 are illustrated as being disposed such that respective axes of rotation 111a, 112a, and 113a are co-planar. It will be appreciated, however, that rotation of first revolute joint 111, second revolute joint 112, and/or third revolute joint 113 will result in articulation of an adjacent member's axis of rotation out of the illustrated plane. It may be observed, therefore, that first revolute joint 111, second revolute joint 112, and third revolute joint 113 provide shoulder joint 110 with a 3 DOF articulation capability.

Figure 2:
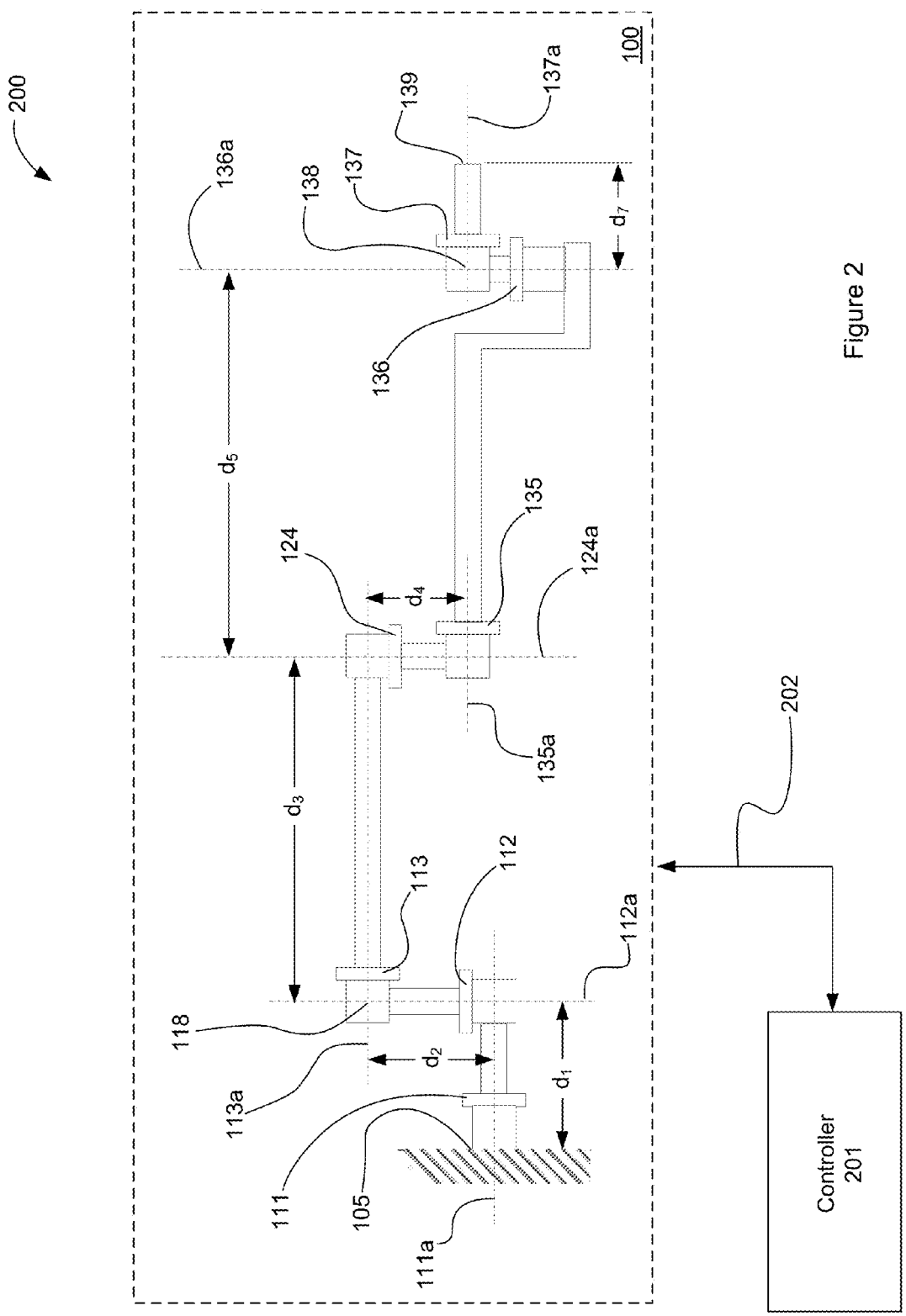
FIG. 2 shows an example of robotic manipulator system, according to an embodiment.

Referring still to FIG. 2, distal end 139 of robotic manipulator 100 is proximate to wrist joint 130 (FIG. 1), which includes fifth revolute joint 135, sixth revolute joint 136, and seventh revolute joint 137. Distal end 139 may be attached to a tool (which may be referred to as an "end effector"). Moreover, the three axis orientation and position of distal end 139 may be referred to as the "tool control point" or "TCP". Each revolute joint 135, 136, and 137 may be rotatably coupled to a corresponding actuator so as to be rotatable about a respective axis of rotation. For example, fifth revolute joint 135 is rotatable about fifth axis of rotation 135a; sixth revolute joint 136 is rotatable about sixth axis of rotation 136a; and seventh revolute joint 137 is rotatable about seventh axis of rotation 137a. In the illustrated embodiment, fifth axis of rotation 135a, sixth axis of rotation 136a, and sixth axis of rotation 136a each intersect at a common point, wrist joint origin 138. As a result, wrist joint 130 may be regarded as a spherical joint. For clarity of illustration, each of fifth revolute joint 135, sixth revolute joint 136, and seventh revolute joint 137 are illustrated as being disposed such that respective axes of rotation 135a, 136a, and 137a are co-planar. It will be appreciated, however, that rotation of fifth revolute joint 135 and/or sixth revolute joint 136 will result in articulation of an adjacent revolute joint's axis of rotation out of the illustrated plane. As a result, fifth revolute joint 135, sixth revolute joint 136, and seventh revolute joint 137 provide wrist joint 130 with a 3 DOF articulation capability.

Elbow joint 120 (FIG. 1) may be disposed between and coupled with shoulder joint 110 and wrist joint 130. In the embodiment illustrated in FIG. 2, elbow joint 120 includes fourth revolute joint 124. Revolute joint 124 may be rotatably coupled to a corresponding actuator so as to be rotatable about fourth axis of rotation 124a. It may be observed that fourth axis of rotation 124a may be substantially orthogonal to each of third axis of rotation 113a and fifth axis of rotation 135a. Fourth revolute joint 124 provides elbow joint 120 with a one DOF articulation capability.

Controller 201 may be operable to control the articulation of robotic manipulator 100. For example controller 201 may be configured to control a respective angle, $q_i$, of each revolute joint. More particularly controller 201 may be operable to detect and control an angular position $q_1$ of first revolute joint 111; an angular position $q_2$ of second revolute joint 112; an angular position $q_3$ of third revolute joint 113; an angular position $q_4$ of fourth revolute joint 124; an angular position $q_5$ of fifth revolute joint 135; an angular position $q_6$ of sixth revolute joint 136; and an angular position $q_7$ of seventh revolute joint 137.

Controller 201 may be communicatively coupled with robotic manipulator by way of communication paths 202. In some embodiments, controller 201 may be proximate to robotic manipulator 100; in other implementations controller 201 may be located remotely, from robotic manipulator 100. For example, controller 201 may include or be part of a teleoperator control station located any arbitrary distance from robotic manipulator 100. Controller 201 may include provisions for operator ("user") input/output. In general, controller 201 may be configured to allow the user to plan and execute articulations of robotic manipulator 100. Such articulations, in some embodiments, may be carried out autonomously, or semi-autonomously.

According to the presently disclosed techniques, controller 201 may be configured to receive parameters defining a desired TCP, the parameters including the three axis position and orientation of the desired TCP. In addition, controller 201 may be configured to determine a set of solutions to an inverse kinematic relationship between the received TCP parameters and the respective angular positions of the seven revolute joints of robotic manipulator 100. In an embodiment, the set of solutions specifies, in terms of angular position $q_1$ of first revolute joint 111, at least one set of angular positions of the second, third, fourth, fifth, sixth, and seventh revolute joints. Advantageously, the set of solutions result from solving only closed-form mathematical expressions.

As disclosed hereinabove, in the absence of the present teachings, closed-form mathematical expressions of the reverse kinematic relationship between TCP parameters and respective angular positions of revolute joints of robotic manipulator 100 have been unknown. The present inventor has appreciated that these closed-form expressions may be derived and used to advantage when executing and/or planning articulations of robotic manipulator 100. The derivation of the closed-form expressions is detailed hereinbelow.

The derivation may begin with describing the forward kinematics of robotic manipulator 100 using homogeneous transformation matrices using, expressed, for convenience, using the so-called Denavit-Hartenberg convention. Robotic manipulator 100 may be regarded as a series of articulating joints, or "links", and each link may be regarded as having a reference frame attached to it. In the present derivation, frame 0 is a ground reference frame, and frames 1 through 7 are the seven link frames, one for each of the seven revolute joints, as illustrated in FIG. 1. The position of any point in space can be resolved in frame n as a 3-vector $p_n$, for n=0 through 7. The relationship between any two successive frames may be described as $$\begin{Bmatrix} p_{j-1} \\ 1 \end{Bmatrix} = {}^{j-1}T_j \begin{Bmatrix} p_j \\ 1 \end{Bmatrix},$$

where ${}^{j-1}T_j$ is a homogeneous matrix. More particularly, ${}^{j-1}T_j$ may be defined as the 4×4 homogenous matrix, $$^{j-1}T_n = \begin{bmatrix} {}^{j-1}R_j & {}^{j-1}P_j \\ 0 & 1 \end{bmatrix},$$

where ${}^{j-1}R_j$ is an orthogonal 3×3 matrix, the columns of which are the unit basis vectors $x_j$, $y_j$ and $z_j$ of frame 'j' resolved in frame j−1, and ${}^{j-1}P_j$ is a 3-vector resolving the position of the origin of frame j in the coordinates of frame j−1.

The relationship between frame j−1 and frame j may be generally defined by the following transformations: (1) rotation about the $z_{j-1}$ axis by angular increment $q_j$; (2) translation along the $z_{j-1}$ axis by distance $d_j$; (3) translation along (rotated) axis $x_j$ by distance $a_j$; and (4) rotation about axis $x_j$ by $\alpha_j$. An example set of values of $\alpha_j$, $a_j$, $d_j$ for robotic manipulator 100 are given in Table 1. It may be noted that, for purposes of the following derivation, $d_6$ and each $a_j$ is zero, and $\alpha_j$ is either zero or an odd integral multiple of $\pi/2$. In such a configuration, it may be shown that $$^{j-1}R_j = \begin{bmatrix} c_j & -s_j\cos(\alpha_j) & s_j\sin(\alpha_j) \\ s_j & c_j\cos(\alpha_j) & -c_j\sin(\alpha_j) \\ 0 & \sin(\alpha_j) & \cos(\alpha_j) \end{bmatrix}; \text{ and } {}^{j-1}P_j = \begin{bmatrix} 0 \\ 0 \\ d_j \end{bmatrix},$$

where $c_j \equiv \cos(q_j)$ and $s_j \equiv \sin(q_j)$.

TABLE 1

| Joint No. | Name | a (m) | α (rad) | d (m) |
|---|---|---|---|---|
| 1 | Shoulder Yaw | 0 | π/2 | $d_1$ |
| 2 | Shoulder Pitch | 0 | −π/2 | $d_2$ |
| 3 | Shoulder Roll | 0 | π/2 | $d_3$ |
| 4 | Elbow Pitch | 0 | −π/2 | $d_4$ |
| 5 | Wrist Roll | 0 | π/2 | $d_5$ |
| 6 | Wrist Pitch | 0 | −π/2 | 0 |
| 7 | Wrist Yaw | 0 | 0 | $d_7$ |

Using matrix multiplication, transformations between non-successive frames may be determined, such that, for example $$^0T_7 = \begin{bmatrix} {}^0R_7 & {}^0P_7 \\ 0 & 1 \end{bmatrix} = {}^0T_1 \; {}^1T_2 \; {}^2T_3 \; {}^3T_4 \; {}^4T_5 \; {}^5T_6 \; {}^6T_7,$$

where ${}^0P_7$ is the position of the origin of frame 7 as resolved in ground frame coordinates, and ${}^0R_7$ is the orientation of frame 7 resolved in ground frame coordinates. It will be appreciated that ${}^0P_7$ together with ${}^0R_7$ fully defines the TCP position and orientation parameters (which may be referred to, respectively, as $P_{TCP}$ and $R_{TCP}$, of robotic manipulator 100.

The above-described equations are the well known forward kinematic relationships and readily permit determination of the $P_{TCP}$ and $R_{TCP}$ when each $a_j$, $\alpha_j$, $q_j$, and $d_j$ is known. The presently disclosed techniques enable resolving, by solving only closed form expressions, values for $q_j$, given known values of the $P_{TCP}$ and $R_{TCP}$. These closed form expressions, the derivations of which are provided below, are listed in Table 2.

Equation 1 results from observing that, for spherical wrist joint 130, the three axis position of wrist joint origin 'W' (location 138 FIG. 2) is fully determined by link length d7 and the known parameters of $P_{TCP}$ and $R_{TCP}$. More precisely, 'W' can be related to the TCP parameters by Equation 1:

$$W = P_{TCP} - R_{TCP} \begin{Bmatrix} 0 \\ 0 \\ d_7 \end{Bmatrix}.$$

Based on forward kinematic expressions, it is known that position 'W' is related to the origin of frame '0' by the expression:

$$W = {}^0P_5 = \begin{Bmatrix} \left( \dfrac{-(c_1c_2c_3 - s_1s_3)s_4 - }{c_1s_2c_4} \right) d_5 + (c_1c_2s_3 + s_1c_3)d_4 - (c_1s_2)d_3 + s_1d_2 \\ \left( \dfrac{-(s_1c_2c_3 - c_1s_3)s_4 - }{s_1s_2c_4} \right) d_5 + (s_1c_2s_3 - c_1c_3)d_4 - (s_1s_2)d_3 + c_1d_2 \\ (-s_2c_3s_4 - c_2c_4)d_5 + s_2s_3d_4 + c_2d_3 + d_1 \end{Bmatrix}$$

The present inventor has appreciated that the preceding expression may be made to yield a tractable solution set of $q_2$, $q_3$ and $q_4$ as a function of $q_1$ in the following manner.

It is convenient to initially solve for $q_4$, which, as illustrated in FIG. 1, represents the angular articulation of elbow joint 120, or, more precisely, the angular position of revolute joint 124 (FIG. 2). To solve for $q_4$, the three axis position of location 118 (FIG. 2), representing the origin of frame 2 is first obtained as a function of $q_1$. Location 118 may be referred to as the root position of the upper arm, and may be expressed as:

$$^0P_2 = \begin{Bmatrix} d_2 s_1 \\ -d_2 c_1 \\ d_1 \end{Bmatrix}.$$

Second, the relative vector 'U' from location 118 to wrist joint origin 138 may be expressed in frame 1 as Equation 2:

$$U = \begin{Bmatrix} U_1 \\ U_2 \\ U_3 \end{Bmatrix} = \begin{bmatrix} c_1 & s_1 & 0 \\ 0 & 0 & 1 \\ s_1 & -c_1 & 0 \end{bmatrix} W - \begin{Bmatrix} 0 \\ d_1 \\ d_2 \end{Bmatrix}.$$

Third, it is recognized that because the length of vector 'U' can be expressed, using the law of cosines, as $$U_1^2 + U_2^2 + U_3^2 = d_5^2 + d_4^2 + d_3^2 + 2d_3d_5c_4,$$

and recalling that $c_4 \equiv \cos(q_4)$, $q_4$ may be solved from Equation 3:

$$q_4 = \sigma_4 \cos^{-1}\left(\frac{U_1^2 + U_2^2 + U_3^2 - d_5^2 - d_4^2 - d_3^2}{2d_3d_5}\right).$$

It will be appreciated that Equation 3, where the arc cosine exists, will yield two solutions, namely a first solution where $q_4$ is in the range $[0,\pi]$, such that $s_4 = \sin(q_4) \geq 0$, and $\sigma_4 = 1$; and a second solution where $q_4$ is in the range $[-\pi, 0]$, such that $s_4 \leq 0$, and $\sigma_4 = -1$.

Next, a solution for $q_3$ may be found, components of U having been determined by Equation 2, and the value of $q_4$ having been determined by Equation 3. Referring again to FIG. 1 and FIG. 2, it will be understood that $q_3$ represents the angular position of revolute joint 113. To obtain a closed-form expression for $q_3$, it may first be appreciated that substituting the analytical expression provided above for $^0P_5$ into Equation 2 and performing the indicated operations yields:

$$U = \begin{Bmatrix} U_1 \\ U_2 \\ U_3 \end{Bmatrix} = \begin{Bmatrix} -(c_2c_3s_4 + s_2c_4)d_5 + (c_2s_3)d_4 - (s_2)d_3 \\ (-s_2c_3s_4 + c_2c_4)d_5 + (s_2s_3)d_4 - (c_2)d_3 \\ (s_3s_4)d_5 + (c_3)d_4 \end{Bmatrix}.$$

The preceding equation for $U_3$ may be expressed in terms of 'r' and '$\psi$' by substituting $r(\cos \psi)$ for $d_4$ and $r(\sin \psi)$ for $s_4d_5$, where of 'r' and '$\psi$' are the polar coordinates of $(d_4, d_5s_4)$ which may be expressed as $$r = \sqrt{d_4^2 + d_5^2 s_4^2}$$

and $$\psi = \tan^{-1}\left(\frac{d_5 s_4}{d_4}\right).$$

As a result, $U_3 = r(\sin \psi)s_3 + r(\cos \psi)c_3$, which may be simplified to $U_3 = r(\cos(q_3 - \psi))$ and solved for $q_3$, yielding Equation 4:

$$q_3 = \mathrm{atan2}(d_5s_4, d_4) + \sigma_3 \cos^{-1}\left(\frac{U_3}{\sqrt{d_4^2 + d_5^2 s_4^2}}\right).$$

This equation, similarly to Equation 3, above, will yield two solutions, where the arc cosine exists, with $\sigma_3 = \pm 1$. As a result, a total of four branches of the solution space, for the four possible combinations of positive and negative $\sigma_3$ and $\sigma_4$ may be recognized.

Next, a solution for $q_2$ may be found, taking into account the expressions given above for $U_1$ and $U_2$. Referring again to FIG. 1 and FIG. 2, it will be understood that $q_2$ represents the angular position of revolute joint 112. It has been shown that $U_1 = -(c_2c_3s_4 + s_2c_4)d_5 + (c_2s_3)d_4 - (s_2)d_3$, and $U_2 = (-s_2c_3s_4 + c_2c_4)d_5 + (s_2s_3)d_4 - (c_2)d_3$. It will be appreciated that the preceding equations may be rewritten as $U_1 = (-d_5c_3s_4 + d_4s_3)c_2 + (d_5c_4 + d_3)s_2$; and $U_2 = (d_5c_4 + d_3)c_2 + (-d_5c_3s_4 + d_4s_3)s_2$. Recalling that, as indicated above, $c_2 \equiv \cos(q_2)$, and $s_2 \equiv \sin(q_2)$, the preceding equations may be combined to solve for $q_2$ as indicated in Equation 5:

$(q_2 = a\tan 2(-(d_5c_4+d_3)U_1 + (-d_5c_3s_4+d_4s_3)U_2, (-d_5c_3s_4+d_4s_3)U_1 + (d_5c_4+d_3)U_2$, where $$\mathrm{atan2}(y, x) = \tan^{-1}\left(\frac{y}{x}\right),$$

taken in the appropriate quadrant of $[\pi, -\pi]$ based on the signs of 'x' and 'y'.

Referring again to FIGS. 1 and 2, angles $q_5$, $q_6$, and $q_7$ defining, respectively the angular position of revolute joints 135, 136, and 137 of wrist joint 130 may be determined in the following manner.

First it is noted that the forward kinematic relation defining the orientation of frame 4 may be expressed as Equation 6:

$$Q = \begin{bmatrix} \left(\begin{matrix} c_1c_2c_3 - \\ s_1s_3 \end{matrix}\right)c_4 - c_1s_2s_4 & -c_1c_2s_3 - s_1c_3 & -(c_1c_2c_3 - s_1s_3)s_4 - c_1s_2c_4 \\ \left(\begin{matrix} s_1c_2c_3 + \\ c_1s_3 \end{matrix}\right)c_4 - s_1s_2s_4 & -s_1c_2s_3 + c_1c_3 & -(s_1c_2c_3 + c_1s_3)s_4 - s_1s_2c_4 \\ s_2c_3c_4 + c_2s_4 & -s_2s_3 & -s_2c_3s_4 + c_2c_4 \end{bmatrix},$$

where $Q = {}^0R_4$, and all components of Q have been determined from the previous equations. Second, a rotation matrix 'R' is defined by Equation 7:

$$R = {}^4R_7 = Q^T R_{TCP}$$

Using the forward kinematic relations for the wrist joint, it is known that joint angles $q_5$, $q_6$, and $q_7$ must be such that $$R = \begin{bmatrix} (c_5c_6c_7 - s_5s_7) & -c_5c_6s_7 - s_5c_7 & -c_5s_6 \\ (s_6c_6c_7 + c_5s_7) & -s_5c_6s_7 + c_5c_7 & -s_5s_6 \\ s_6c_7 & -s_6s_7 & c_6 \end{bmatrix}.$$

The preceding expression, particularly the term at (3,3), permits solving for $q_6$ as indicated in Equation 8:

$$q_6 = \sigma_6 \cos^{-1}(R_{33}); (\sigma_6 = \pm 1).$$

Next, from the third column of matrix 'R' above, $q_5$ may be solved as indicated in Equation 9:

$$q_5 = a\tan 2(-\sigma_6 R_{23}, -\sigma_6 R_{13})$$

Finally, from the third row of matrix 'R', $q_7$ may be solved as indicated in Equation 10:

$$q_7 = a\tan 2(-\sigma_6 R_{32}, \sigma_6 R_{31})$$

Thus, it has been shown that determination of each of angle $q_2$, $q_3$, $q_4$, $q_5$, $q_6$, and $q_7$ as a function of $q_1$ may be found by solving only closed-form expressions.

As indicated above, controller 201 may be configured to receive parameters defining the desired TCP parameters and to determine a set of solutions to the inverse kinematic relationship between the received TCP parameters and the respective angular positions of the seven revolute joints of robotic manipulator 100. In addition, controller 201, may be configured to provide a user input/output interface for planning, executing and/or supervising articulations of robotic manipulator 100.

Figure 3:
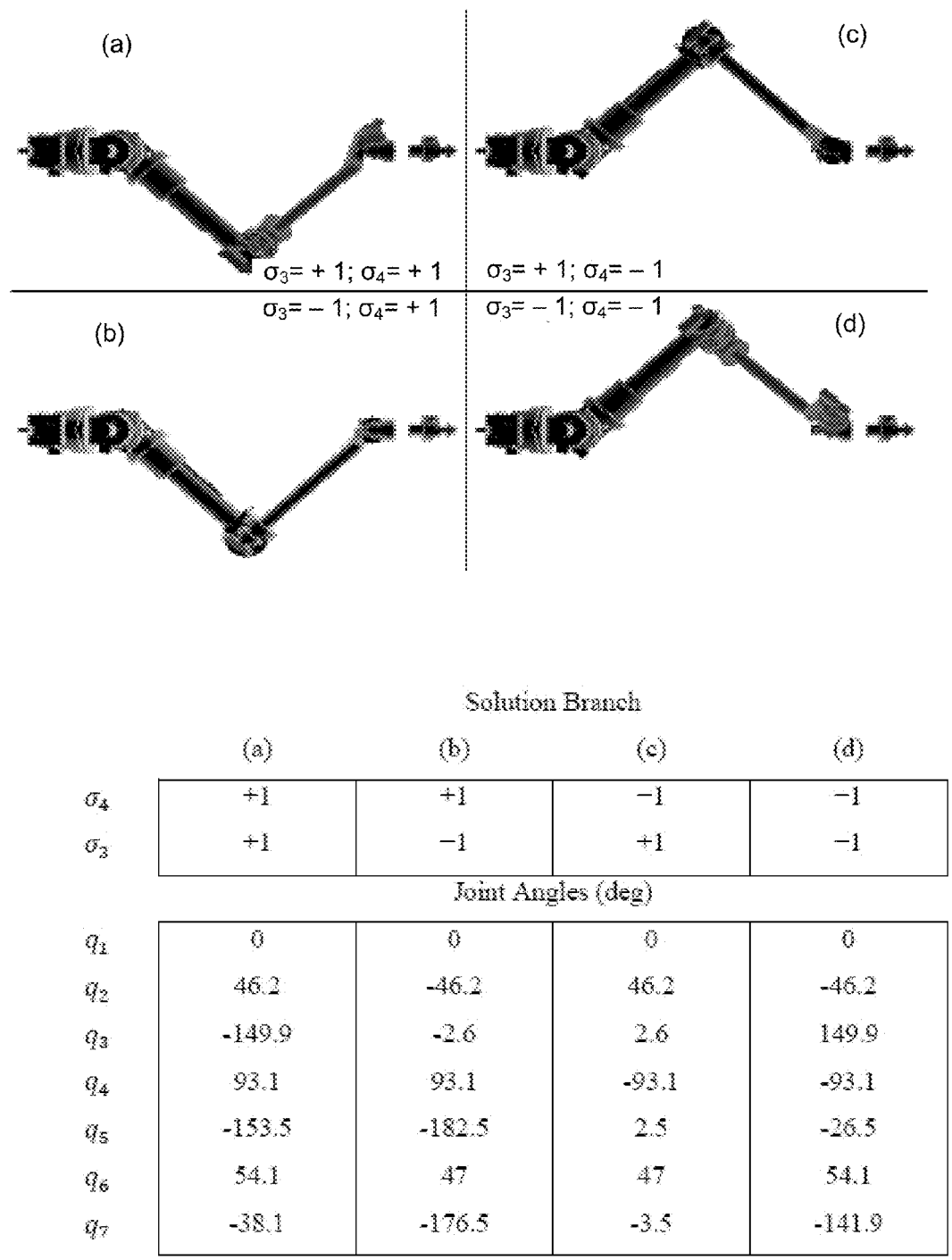
FIG. 3 shows an example of a solution visualization.
Figure 4:
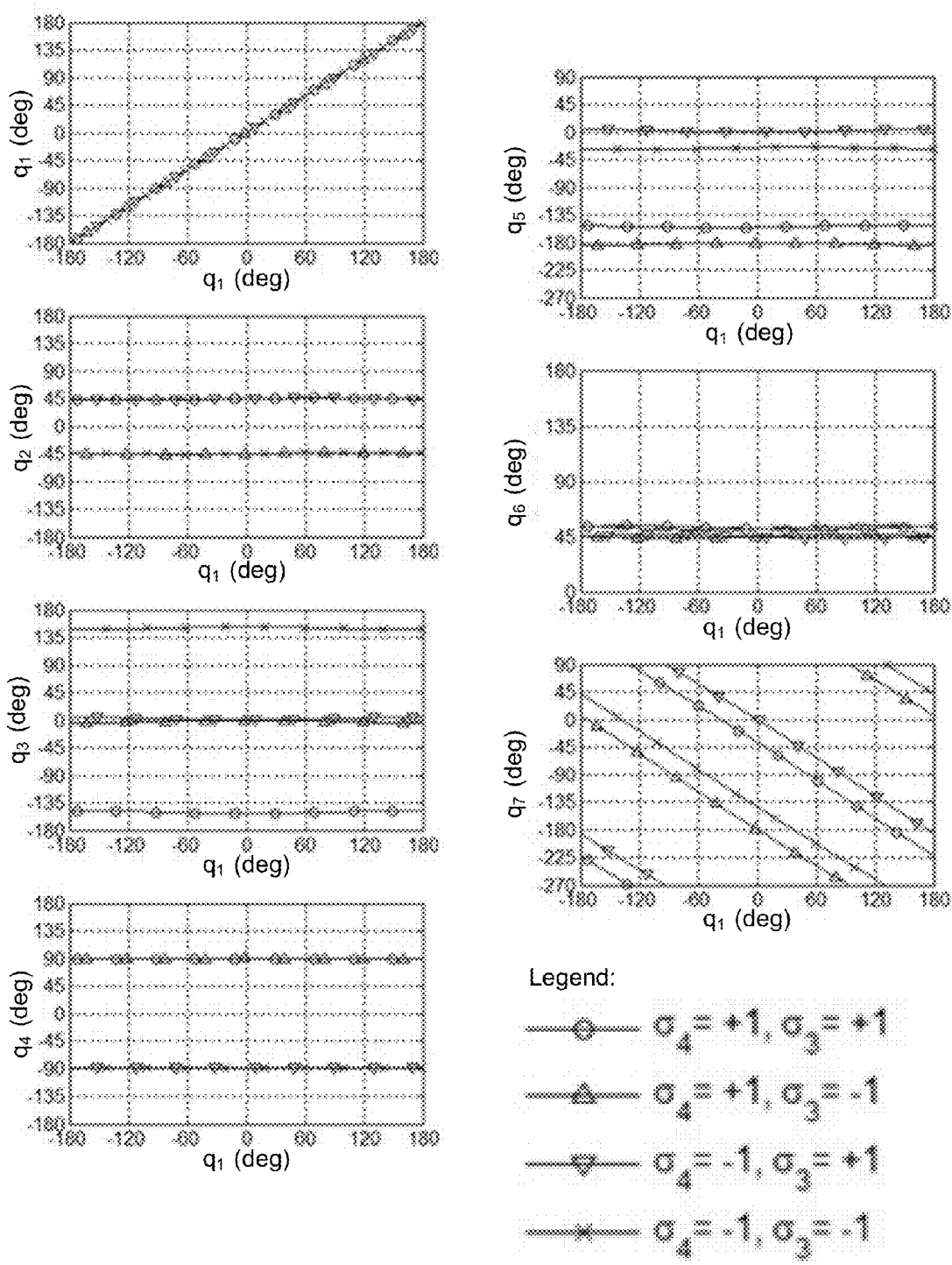
FIG. 4 shows an example of a graphical representation of a solution set.
Figure 5:
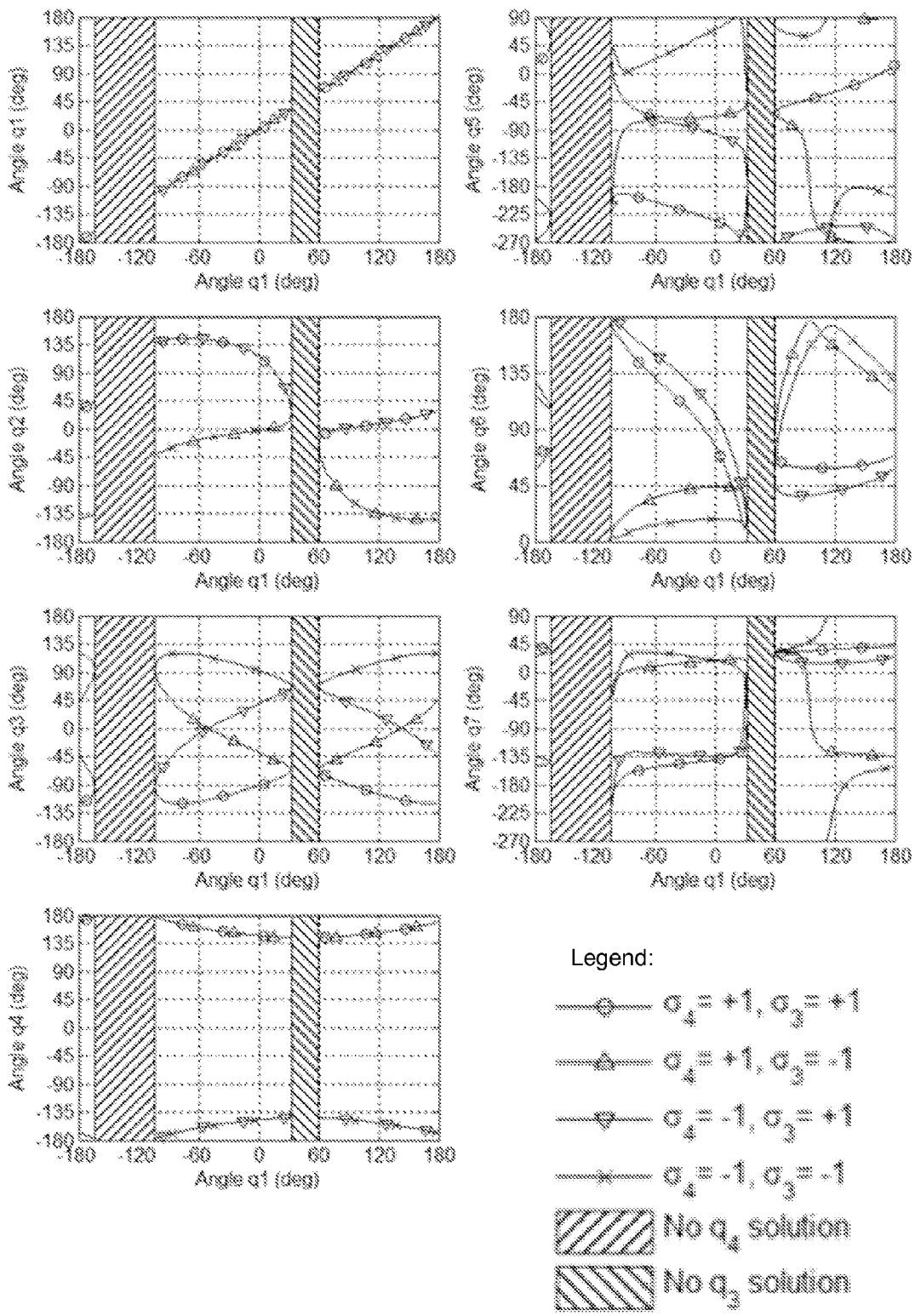
FIG. 5 shows a further example of a graphical representation of a solution set.

A better understanding of the user input/output interface, and associated visualization tools, may be obtained by referring to FIGS. 3-5. In these Figures, the method is applied to an example robotic manipulator for which $d_1$ is 0.36, $d_2$ is 0.26, $d_3$ is 0.90, $d_4$ is –022, $d_5$ is 0.90, and $d_7$ is 0.41, all dimensions in meters. FIG. 3 illustrates an example output of controller 201, to a user specified $P_{TCP}$ of (0, 0, 2) m where the user specified $R_{TCP}$ is an identity matrix. The preceding specification of TCP position and orientation simply requires the TCP to be at the same X and Y coordinate as the base frame and extended two meters in the positive Z direction therefrom, while retaining the same orientation as the base frame. For a user specified value of $q_1=0$, controller 201 may output four solution sets of $q_2$ through $q_7$, each of the four solution sets corresponding to a single one of the four possible combinations of positive and negative $\sigma_3$ and $\sigma_4$. Solution sets associated with $q_4=+1$ correspond to a positive rotation angle of $q_2$, while solution sets associated with $\sigma_4=-1$ correspond to a negative rotation angle of $q_2$. Put otherwise, $\sigma_4$ may be considered as determining whether the elbow is "up" ($\sigma_4=-1$, solution branches (c) and (d)) or "down" ($\sigma_4=+1$, solution branches (a) and (b)). Similarly, solution sets associated with $\sigma_3=+1$ correspond to a negative rotation angle of $q_3$, while solution sets associated with $\sigma_3=-1$ correspond to a positive rotation angle of $q_3$. In the illustrated example, when $\sigma_3$ and $\sigma_4$ are of opposite sign, the specified TCP parameters may be achieved with $q_3=0$ (solution branches (b) and (c)). On the other hand, when $\sigma_3$ and $\sigma_4$ are both positive, $q_3=-152$ degrees (solution branch (a)), and, when $\sigma_3$ and $\sigma_4$ are both negative, $q_3=+152$ degrees solution branch (d).

Referring now to FIG. 4, where no user specified value of $q_1$ is received, controller 201 may output values of solution sets of $q_2$ through $q_7$ as a function of $q_1$. FIG. 4 illustrates the four solution branches for each of seven joint angles plotted as a function of $q_1$ given the same specified TCP parameters as described in connection with FIG. 3. For these specified TCP parameters, all four branches exist for any choice of $q_1$, however, this is not generally the case as will be discussed hereinbelow. In fact, for the present example, it may be observed that, except for $q_7$, the joint angles are insensitive to the value of $q_1$. This may be better understood, referring again to FIG. 2, by appreciating that since in the present example, the seventh axis of rotation 137a is aligned with the first axis of rotation 111a, rotation $q_1$ of revolute joint 111 may be nearly totally compensated for merely by rotation of revolute joint 137.

Referring now to FIG. 5, an example output of controller 201 is illustrated for a user specified $P_{TCP}$ of (–0.1, 0.4, 0.2) m where the user specified $$R_{TCP} = \begin{bmatrix} 1 & 0 & 0.2 \\ -0.1 & -0.8 & 0.6 \\ 0.2 & -0.6 & -0.8 \end{bmatrix}.$$

For this example set of inputs, unlike the preceding example, the TCP position is relatively close to base 105, and the TCP orientation is both non-aligned with and non-parallel to axis of rotation 111a. As a result, a considerably more complex relationship of rotation angles $q_2$ through $q_7$ is illustrated than in the preceding example. Importantly, however, controller 201, configured in accordance with the present teachings, is able to find and display all existing solutions to the inverse kinematic relationships, as well as to identify $q_1$ angles for which no solution exists. In the illustrated example, it may be observed that no solutions exist for $q_1$ angles between approximately 30 to 60 degrees and between approximately –100 to –165 degrees.

It will be appreciated that the controller may be implemented as electronic hardware, computer software, or combinations of both. The hardware and data processing apparatus used to implement the various embodiments may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may be non-transitory and may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Figure 6:
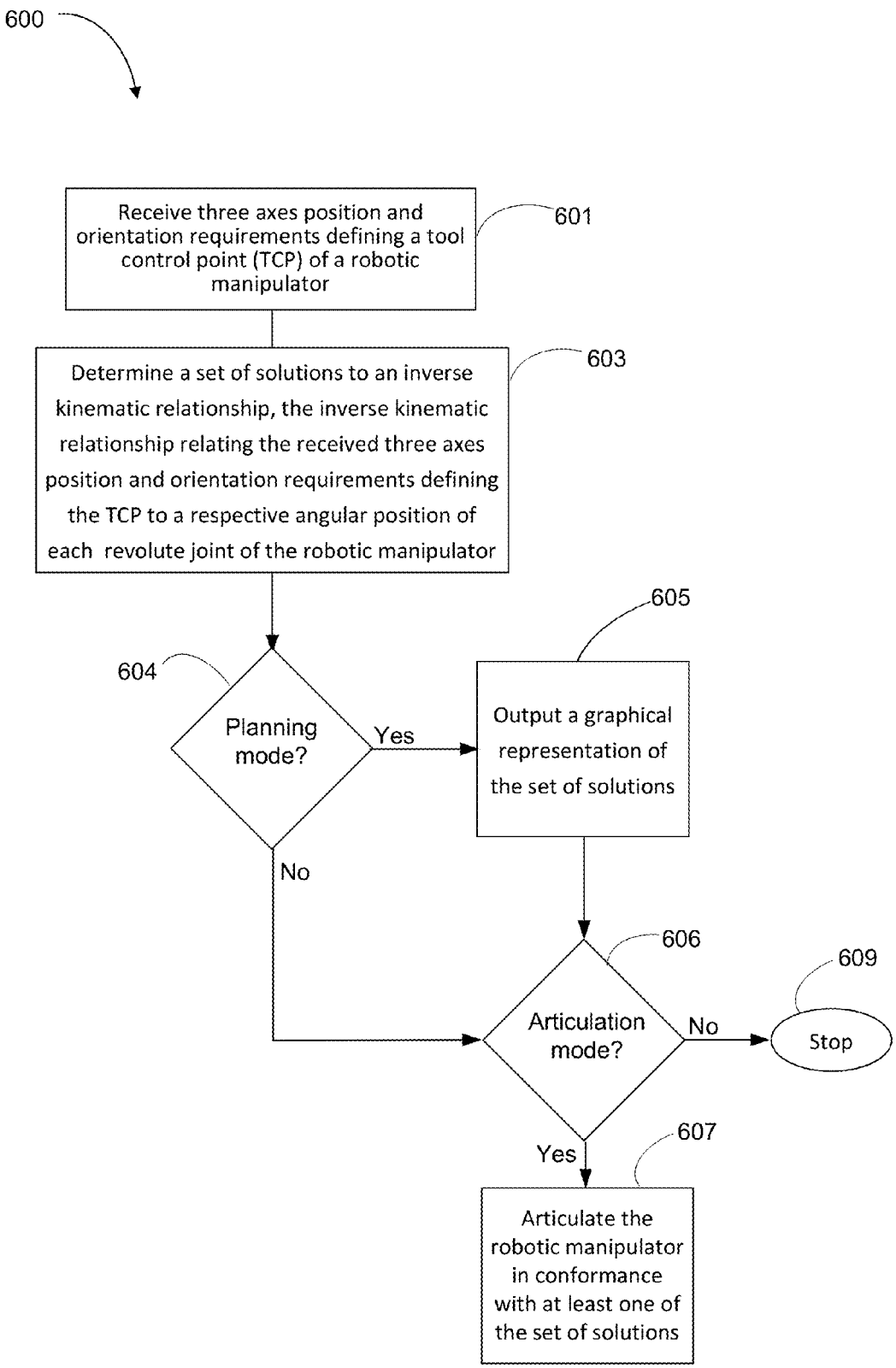
FIG. 6 shows an example of a method in accordance with an embodiment.

FIG. 6 shows an example of a method for planning and/or executing articulations of a robotic manipulator. Method 600 may be carried out using, for example, robotic manipulator system 200 as described hereinabove.

In an embodiment, at block 601, three axes position and orientation requirements defining a tool control point (TCP) of the robotic manipulator may be received. The requirements may be input by a user via an input/output interface implemented by controller 201, for example.

At block 603, a set of solutions to an inverse kinematic relationship may be determined by a controller. The inverse kinematic relationship may relate the received three axes position and orientation requirements to a respective angular position of each revolute joint of the robotic manipulator.

At block 604, a determination may be made as to whether or not the system is in a "planning mode". If the determination is negative, the method may proceed to block 606. If the determination is positive, then, at block 605, a graphical representation of the set of solutions may be outputted and the method may proceed to block 606. The graphical representation may include a 2D or 3D simulation of the robotic manipulator in motion, more particularly, a simulation of dynamic articulations of the robotic manipulator.

At block 606, a determination may be made as to whether or not the system is in a "articulation mode". If the determination is positive, then, at block 607, the robotic manipulator may be articulated in conformance with at least one of the set of solutions. If the determination is negative, the method may stop, block 609.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

TABLE 2

(1) $$W = P_{TCP} - R_{TCP} \begin{Bmatrix} 0 \\ 0 \\ d_7 \end{Bmatrix}$$

(2) $$U = \begin{Bmatrix} U_1 \\ U_2 \\ U_3 \end{Bmatrix} = \begin{bmatrix} c_1 & s_1 & 0 \\ 0 & 0 & 1 \\ s_1 & -c_1 & 0 \end{bmatrix} W - \begin{Bmatrix} 0 \\ d_1 \\ d_2 \end{Bmatrix}$$

(3) $$q_4 = \sigma_4 \cos^{-1}\left(\frac{U_1^2 + U_2^2 + U_3^2 - d_5^2 - d_4^2 - d_3^2}{2 d_3 d_5}\right) \quad (\sigma_4 = \pm 1)$$

(4) $$q_3 = \text{atan2}(d_5 s_4, d_4) + \sigma_3 \cos^{-1}\left(\frac{U_3}{\sqrt{d_4^2 + d_5^2 s_4^2}}\right) \quad (\sigma_3 = \pm 1)$$

(5) $q_2 = \text{atan2}(-(d_5 c_4 + d_3)U_1 + (-d_5 c_3 s_4 + d_4 s_3)U_2, (-d_5 c_3 s_4 + d_4 s_3)U_1 + (d_5 c_4 + d_3)U_2)$ (6) $$Q = \begin{bmatrix} (c_1 c_2 c_3 - s_1 s_3)c_4 - c_1 s_2 s_4 & -c_1 c_2 c_3 - s_1 s_3 & -(c_1 c_2 c_3 - s_1 s_3)s_4 - c_1 s_2 c_4 \\ (s_1 c_2 c_3 + c_1 s_3)c_4 - s_1 s_2 s_4 & -s_1 c_2 c_3 + c_1 s_3 & -(s_1 c_2 c_3 + c_1 s_3)s_4 - s_1 s_2 c_4 \\ s_2 c_3 c_4 + c_2 s_4 & -s_2 s_3 & -s_2 c_3 s_4 + c_2 c_4 \end{bmatrix}$$

(7) $R = Q^T R_{tip}$
(8) $q_6 = \sigma_6 \cos^{-1}(R_{33}); (\sigma_6 = \pm 1)$
(9) $q_5 = \text{atan2}(-\sigma_6 R_{23}, -\sigma_6 R_{13})$
(10) $q_7 = \text{atan2}(-\sigma_6 R_{32}, \sigma_6 R_{31})$

What is claimed is:

1. A method comprising;

receiving three axes position and orientation requirements defining a tool control point (TCP) of a robotic manipulator, the robotic manipulator comprising at least seven revolute joints, wherein:

the TCP is proximate to a distal end of the robotic manipulator, the distal end being proximate to a wrist joint, the wrist joint being articulable in a first set of three axes intersecting at a common wrist joint origin by way of a fifth revolute joint, a sixth revolute joint and a seventh revolute joint, the fifth axis of rotation being orthogonal to the sixth axis of rotation, and the seventh axis of rotation being orthogonal to the sixth axis of rotation;

a shoulder joint is proximal to a proximal end of the robotic manipulator, the shoulder joint being rotatable about a first axis of rotation by way of a first revolute joint, about a second axis of rotation by way of a second revolute joint and about a third axis of rotation by a third revolute joint, the first axis of rotation being orthogonal to the second axis of rotation, and the third axis of rotation being orthogonal to the second axis of rotation; and the robotic manipulator further comprises an elbow joint disposed between the shoulder joint and the wrist joint, the elbow joint being rotatable about a fourth axis of rotation by way of a fourth revolute joint, the fourth axis of rotation being orthogonal to the third axis of rotation and to the respective axis of rotation of the fifth revolute joint;

determining, with a controller, a set of solutions to an inverse kinematic relationship, the inverse kinematic relationship relating the received three axes position and orientation requirements defining the TCP to a respective angular position of each of the seven revolute joints, wherein the set of solutions specifies, in terms of an angular position of the first revolute joint and parameterized link lengths, at least one set of angular positions of the second, third, fourth, fifth, sixth and seventh revolute joints; and the set of solutions result from solving only a set of closed-form mathematical expressions the set of closed-form mathematical expressions being derived from one or more forward kinematic equations that define the TCP in terms of the respective angular position of each of the seven revolute joints.

2. The method of claim 1, wherein the first revolute joint is nearer to the proximal end of the robotic manipulator than both of the second revolute joint and the third revolute joint.

3. The method of claim 1, wherein the robotic manipulator comprises exactly seven revolute joints.

4. The method of claim 1, wherein the shoulder joint is spherical.

5. The method of claim 1, further comprising articulating the robotic manipulator in conformance with at least one of the set of solutions.

6. The method of claim 1, further comprising outputting a graphical representation of the set of solutions.

7. The method of claim 6, wherein the graphical representation comprises a 2D or 3D simulation of dynamic articulations of the robotic manipulator.

8. A system comprising: a robotic manipulator and a controller, the robotic manipulator comprising a shoulder joint, a wrist joint and an elbow joint, and at least seven revolute joints, wherein:

three axes position and orientation requirements define a tool control point (TCP) of the robotic manipulator, the TCP being proximate to a distal end of the robotic manipulator, the distal end being proximate to the wrist joint, the wrist joint being articulable in a first set of three axes intersecting at a common wrist joint origin by way of a fifth revolute joint, a sixth revolute joint and a seventh revolute joint, each of the fifth, sixth and seventh revolute joints having a respective axis of rotation, the fifth axis of rotation being orthogonal to the sixth axis of rotation, and the seventh axis of rotation being orthogonal to the sixth axis of rotation;

a proximal end of the robotic manipulator is proximate to the shoulder joint, the shoulder joint being rotatable about a first axis of rotation by way of a first revolute joint, about a second axis of rotation by way of a second revolute joint and about a third axis of rotation by a third revolute joint, the first axis of rotation being orthogonal to the second axis of rotation, and the third axis of rotation being orthogonal to the second axis of rotation;

the elbow joint is disposed between the shoulder joint and the wrist joint, the elbow joint being rotatable about a fourth axis of rotation by way of a fourth revolute joint, the fourth axis of rotation being orthogonal to the third axis of rotation and to the respective axis of rotation of the fifth revolute joint; and the controller is configured to receive the three axes position and orientation requirements defining the TCP of the robotic manipulator and to determine a set of solutions to an inverse kinematic relationship, the inverse kinematic relationship relating the received three axes position and orientation requirements defining the TCP to a respective angular position of each of the seven revolute joints, wherein the set of solutions specifies, in terms of an angular position of the first revolute joint and parameterized link lengths, at least one set of angular positions of the second, third, fourth, fifth, sixth and seventh revolute joints; and the set of solutions result from solving only a set of closed-form mathematical expressions, the set of closed-form mathematical expressions being derived from one or more forward kinematic equations that define the TCP in terms of the respective angular position of each of the seven revolute joints.

9. The system of claim 8, wherein the first revolute joint is nearer to the proximal end of the robotic manipulator than both of the second revolute joint and the third revolute joint.

10. The system of claim 8, wherein the robotic manipulator comprises exactly seven revolute joints.

11. The system of claim 8, wherein the shoulder joint is spherical.

12. The system of claim 8, wherein the controller is configured to control articulation of the robotic manipulator in conformance with at least one of the set of solutions.

13. The system of claim 8, wherein the controller is configured to output a graphical representation of the set of solutions.

14. A non-transitory computer-readable storage medium having stored thereon instructions which, when executed by a controller, cause the controller to perform operations, the operations comprising:

receiving three axes position and orientation requirements defining a tool control point (TCP) of a robotic manipulator, the robotic manipulator comprising at least seven revolute joints, wherein:

the TCP is proximate to a distal end of the robotic manipulator, the distal end being proximate to a wrist joint, the wrist joint being articulable in a first set of three axes intersecting at a common wrist joint origin by way of a fifth revolute joint, a sixth revolute joint and a seventh revolute joint, each of the fifth, sixth and seventh revolute joints having a respective axis of rotation, the fifth axis of rotation being orthogonal to the sixth axis of rotation, and the seventh axis of rotation being orthogonal to the sixth axis of rotation;

a shoulder joint is proximal to a proximal end of the robotic manipulator, the shoulder joint being rotatable about a first axis of rotation by way of a first revolute joint, about a second axis of rotation by way of a second revolute joint and about a third axis of rotation by a third revolute joint, the first axis of rotation being orthogonal to the second axis of rotation, the third axis of rotation being orthogonal to the second axis of rotation; and the robotic manipulator further comprises an elbow joint disposed between the shoulder joint and the wrist joint, the elbow joint being rotatable about a fourth axis of rotation by way of a fourth revolute joint, the fourth axis of rotation being orthogonal to the third axis of rotation and to the respective axis of rotation of the fifth revolute joint;

determining, with the controller, a set of solutions to an inverse kinematic relationship, the inverse kinematic relationship relating the received three axes position and orientation requirements defining the TCP to a respective angular position of each of the seven revolute joints, wherein the set of solutions specifies, in terms of an angular position of the first revolute joint and parameterized link lengths, at least one set of angular positions of the second, third, fourth, fifth, sixth and seventh revolute joints; and the set of solutions result from solving only a set of closed-form mathematical expressions the set of closed-form mathematical expressions being derived from one or more forward kinematic equations that define the TCP in terms of the respective angular position of each of the seven revolute joints.

15. The computer-readable storage medium of claim 14, wherein the first revolute joint is nearer to the proximal end of the robotic manipulator than both of the second revolute joint and the third revolute joint.

16. The computer-readable storage medium of claim 14, wherein the robotic manipulator comprises exactly seven revolute joints.

17. The computer-readable storage medium of claim 14, further comprising articulating the robotic manipulator in conformance with at least one of the set of solutions.

18. The computer-readable storage medium of claim 14, further comprising outputting a graphical representation of the set of solutions.

* * * * *